United States Patent
Shimura

(10) Patent No.: US 7,201,813 B2
(45) Date of Patent: Apr. 10, 2007

(54) PNEUMATIC TIRE HAVING A FILM-SHAPED ELECTRONIC DEVICE AND METHOD OF MOUNTING THE FILM-SHAPED ELECTRONIC DEVICE

(75) Inventor: Kazuhiro Shimura, Hiratsuka (JP)

(73) Assignee: The Yokoham Rubber Co., Ltd., Tokyo (JP)

( * ) Notice: Subject to any disclaimer, the term of this patent is extended or adjusted under 35 U.S.C. 154(b) by 182 days.

(21) Appl. No.: 10/516,737

(22) PCT Filed: Aug. 28, 2003

(86) PCT No.: PCT/JP03/10909

§ 371 (c)(1),
(2), (4) Date: Dec. 6, 2004

(87) PCT Pub. No.: WO2004/022362

PCT Pub. Date: Mar. 18, 2004

(65) Prior Publication Data

US 2006/0174985 A1    Aug. 10, 2006

(30) Foreign Application Priority Data

Aug. 30, 2002   (JP) .............................. 2002-254387

(51) Int. Cl.
*B29C 65/00* (2006.01)
*B60C 23/00* (2006.01)

(52) U.S. Cl. ................. 156/60; 152/152.1; 152/450
(58) Field of Classification Search ................. None
See application file for complete search history.

(56) References Cited

U.S. PATENT DOCUMENTS 5,181,975 A    1/1993   Pollack et al.

FOREIGN PATENT DOCUMENTS

| EP | 1223056 A2 | 7/2002 |
|----|-----------|--------|
| JP | 07-030104 A1 | 1/1995 |
| JP | 10-324120 A1 | 12/1998 |
| WO | WO-99/53740 A1 | 10/1999 |
| WO | WO 01/36220 * | 5/2001 |

OTHER PUBLICATIONS

International Search Report for PCT/JP03/10909 mailed on Dec. 24, 2003.

* cited by examiner

*Primary Examiner*—Justin R. Fischer
(74) *Attorney, Agent, or Firm*—Greer, Burns & Crain, Ltd.

(57) ABSTRACT

A pneumatic tire having a film-shaped electronic device on a surface of the tire or inside the tire. The film-shaped electronic device is slidable between sheet-shaped members disposed on both surfaces of the film-shaped electronic device.

10 Claims, 3 Drawing Sheets (a)

(b)

PNEUMATIC TIRE HAVING A FILM-SHAPED ELECTRONIC DEVICE AND METHOD OF MOUNTING THE FILM-SHAPED ELECTRONIC DEVICE

TECHNICAL FIELD

The present invention relates to a pneumatic tire having a film-shaped electronic device and a method of mounting the film-shaped electronic device, and more particularly, to a pneumatic tire having a film-shaped electronic device and a method of mounting the film-shaped electronic device, in which the film-shaped electronic device can be prevented from breaking.

TECHNICAL BACKGROUND

In recent years, there is proposed a pneumatic tire having a transponder which has functions of a transmitter and a receiver to obtain information on identification of the pneumatic tire and information such as pressure, temperature and rotation speed of the tire (for example, Unexamined Japanese Utility Model Publication No. 7-30104). Such transponders used for pneumatic tires comprise, in general, a cylindrical glass protection container, a coil-shaped antenna, and an integrated circuit for storing information, the antenna and integrated circuit being contained in the glass protection container.

Pneumatic tires employing the transponder are very useful since various pieces of information stored in the integrated circuit can easily be obtained as necessary. However, the cost of the above-structured transponder is high, and therefore, there is a problem of a great increase in the cost of the pneumatic tire.

In order to solve the problem, the present inventor produced a pneumatic tire into which an inexpensive film-shaped transponder in general use (a transponder using a frequency band of 13 MHz standardized by ISO) was embedded, and as a result, it was realized that the film-shaped transponder was significantly inferior in durability to that using the glass protection container.

That is, there arises such a problem that, when air pressure is applied to inflate the pneumatic tire fitted to a rim, the transponder fixed to the pneumatic tire is pulled by inflation deformation of the pneumatic tire and is broken.

DISCLOSURE OF THE INVENTION

An object of the present invention is to provide a pneumatic tire having a film-shaped electronic device and a method of mounting the film-shaped electronic device, in which the film-shaped electronic device can be prevented from breaking even if the film-shaped electronic device such as an inexpensive film-shaped transponder is mounted on or inside a pneumatic tire.

In order to achieve the above object, a pneumatic tire according to present invention has a film-shaped electronic device on a surface of the tire or inside the tire, the film-shaped electronic device being slidable between sheet-shaped members disposed on both surfaces of the film-shaped electronic device.

A method of mounting a film-shaped electronic device according to the present invention comprises the steps of forming a film-shaped electronic device containing sheet assembly having sheet-shaped members and an electronic device slidably contained between the sheet-shaped members, and fixing the film-shaped electronic device containing sheet assembly inside or to a surface of an uncured tire, or to a surface of a cured tire.

According to the present invention described above, when air pressure is applied to inflate the pneumatic tire, the sheet-shaped members are pulled and deformed with inflation deformation of the pneumatic tire. However, the film-shaped electronic device moves between the sheet-shaped members, and therefore, the film-shaped electronic device does not receive influences of the tensile deformation. Also, when the pneumatic tire is deformed by compression during traveling, influences thereof on the film-shaped electronic device can be avoided. Accordingly, the film-shaped electronic device mounted on or inside the pneumatic tire can be prevented from breaking, and the inexpensive film-shaped electronic device is available.

BEST MODES FOR CARRYING OUT THE INVENTION

The embodiments of the present invention will be described in detail below with reference to the drawings.

Figure 1:
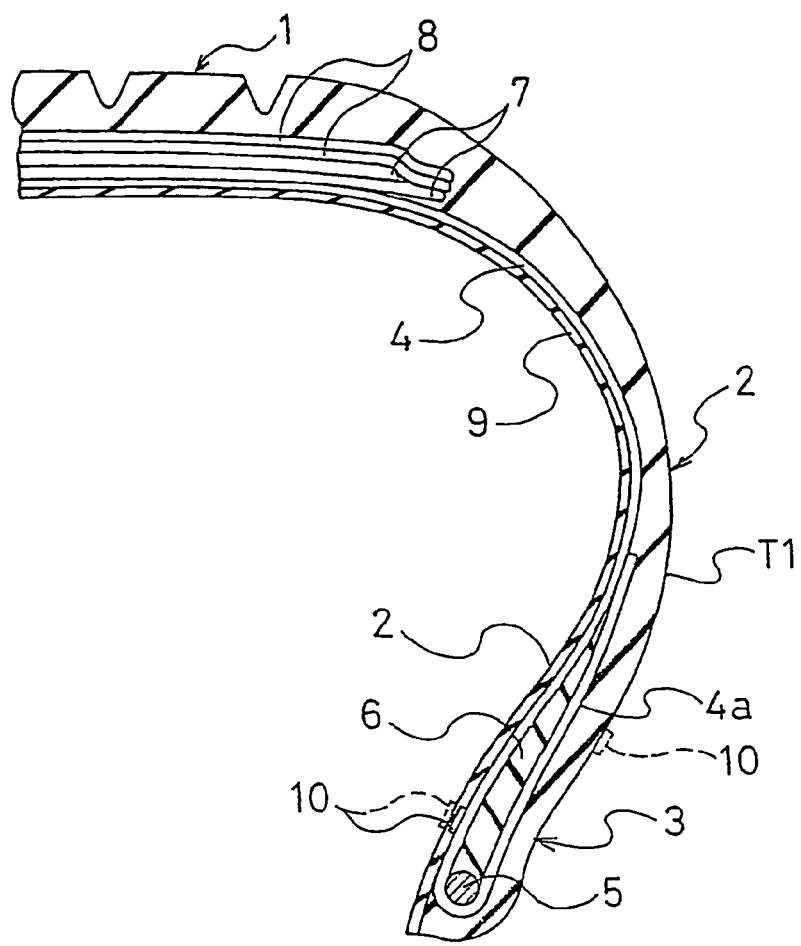
FIG. 1 is a main cross-sectional view showing an embodiment of a pneumatic tire according to the present invention.

Referring to FIG. 1, there is shown an embodiment of a pneumatic tire having a film-shaped electronic device according to the present invention, in which reference numeral 1 denotes a tread, reference numeral 2 denotes a sidewall, and reference numeral 3 denotes a bead. A carcass ply 4 is disposed between the left and right beads 3, and each end portion 4a thereof is turned up around a bead core 5 from the inner side of the tire towards the outer side so as to sandwiching a bead filler 6. A plurality of belt plies 7 are provided radially outwardly of the carcass ply 4 in the tread 1, and a plurality of belt cover plies 8 are placed radially outwardly of the belt plies 7. An inner liner ply 9 is provided inwardly of the carcass ply 4.

Fixed between the carcass ply 4 and the inner liner ply 9 inside the bead 3 of the tire is a film-shaped electronic device containing sheet assembly 10 in which a film-shaped transponder 20 (see FIGS. 2 and 3) is contained.

Figure 2:
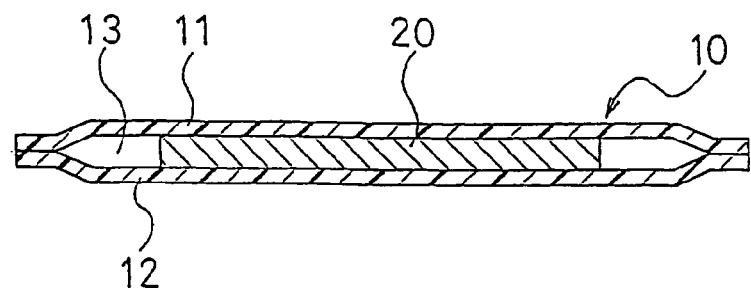
FIG. 2 is an enlarged cross-sectional view of the film-shaped electronic device containing sheet assembly in FIG. 1.

The film-shaped electronic device containing sheet assembly 10, as shown in FIG. 2, comprises two sheet-shaped members 11 and 12 formed of a material that enables the transponder 20 to be slidable, and all peripheral edges of the two sheet-shaped members 11 and 12 which are overlapped to each other are bonded to each other to thereby form a sealed room 13 between the two sheet-shaped members 11 and 12. The transponder 20 is placed in the room 13, and is slidable between the two sheet-shaped members 11 and 12 which are disposed on the both surfaces of the transponder 20. The sheet-shaped member 11 is completely adhered to the inner surface of the carcass ply 4, and the sheet-shaped member 12 is completely adhered to the outer surface of the inner liner ply 9.

Figure 3:
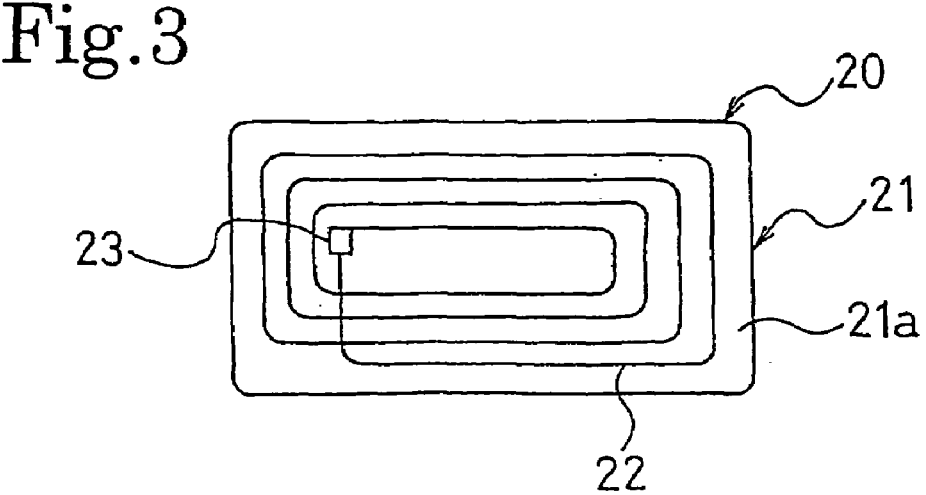
FIG. 3 is a plan view of the transponder in FIG. 2.

A transponder employing a frequency band of 13 MHz standardized by ISO is used for the film-shaped transponder 20, and as shown in FIG. 3, the film-shaped transponder 20 includes a base film 21 formed of resin such as polyimide, nylon or polyethylene terephthalete, an coil-shaped antenna 22 formed on one surface 21a thereof by printing, and an integrated circuit 23 affixed to the surface 21a by brazing or the like.

Figure 4:
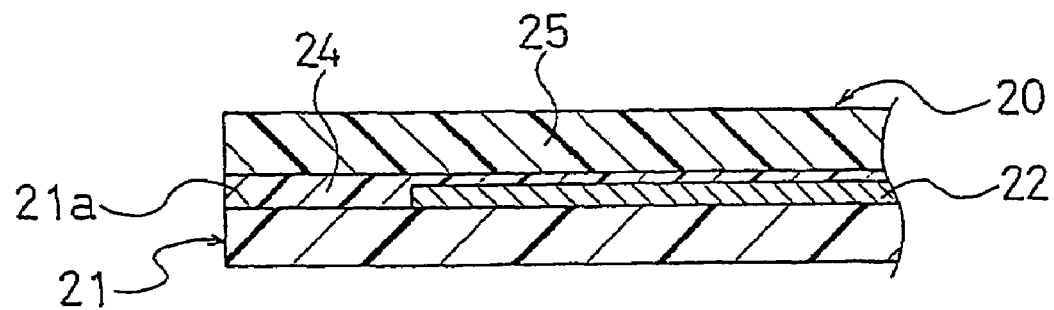
FIG. 4 is a main enlarged cross-sectional view of the transponder in FIG. 2.

As shown in FIG. 4, laminated on the surface 21a of the base film 21 via an adhesive layer 24 is a protection layer 25 formed of the same material as that of the base film 21. It is preferable that the transponder to be mounted in the tire be in the range of 0.2 to 0.8 mm in thickness.

The antenna 22 of the transponder 20 is connected to the integrated circuit 23, and various pieces of tire identification information stored in the integrated circuit 23 can be read via the antenna 22 by a reading/writing device (not shown) for the transponder 20, and new information can be stored in the integrated circuit 23 by the reading/writing device.

The above-mentioned transponder 20 is mounted inside the pneumatic tire as follows. First, the transponder 20 is placed between the sheet-shaped members 11 and 12 in a sandwiched fashion, and the peripheral edges of the sheet-shaped members 11 and 12 are then adhered to each other to thereby form the film-shaped electronic device containing sheet assembly 10 containing the transponder 20 slidably in the room 13 between the sheet-shaped members 11 and 12.

The film-shaped electronic device containing sheet assembly 10 is adhered onto the inner liner ply 9 after the inner liner ply 9 is wound around a tire building drum in a conventional uncured tire manufacturing process, and the film-shaped electronic device containing sheet assembly 10 is placed inside an uncured tire. The uncured tire is cured to thereby obtain the pneumatic tire of FIG. 1.

According to the present invention mentioned above, when air pressure is applied to inflate the pneumatic tire which is assembled to a rim, the sheet-shaped members 11 and 12 are pulled with inflation deformation of the pneumatic tire. The transponder 20, which is slidable between the sheet-shaped members 11 and 12, is not deformed by the pulling, since the transponder 20 moves between the sheet-shaped members 11 and 12 in accordance with the inflation deformation of the pneumatic tire.

Also, when the pneumatic tire is deformed by compression during traveling, influences thereof on the transponder 20 can be avoided since the transponder 20 is movable between the sheet-shaped members 11 and 12. Accordingly, the film-shaped transponder 20 mounted in the pneumatic tire can be prevented from breaking. Therefore, the inexpensive film-shaped transponder 20 which employs a frequency band of 13 MHz standardized by ISO is available, and the cost of the pneumatic tire having the transponder does not increase significantly.

In the present invention, it is preferable that the transponder 20 be provided between the carcass ply 4 and the inner liner ply 9, as described above, in terms of the minimum affection of tensile and compressive deformation of the tire on the transponder 20. However, it is not limited thereto. For example, the transponder 20 may be placed between the carcass ply 4 and a rubber portion of the sidewall located outwardly of the carcass ply 4.

In this case, the transponder 20 is mounted as follows. In the conventional uncured tire manufacturing process, the carcass ply 4 is wound around a tire building drum, and the film-shaped electronic device containing sheet assembly 10 containing the transponder 20 is then adhered onto the carcass ply 4 to be placed inside the uncured tire.

In the above embodiment, an example is shown of the case where the film-shaped electronic device containing sheet assembly 10 containing the transponder 20 is fixed inside the tire. In the alternative, the film-shaped electronic device containing sheet assembly 10 containing the transponder 20 may be fixed on a surface of the tire, as shown in FIG. 1.

The tire surface may be an outer surface T1 of the tire or an inner surface T2 of the tire. In the case of the tire outer surface T1, the film-shaped electronic device containing sheet assembly 10 containing the transponder 20 is preferably fixed to the sidewall 2, and in the case of the tire inner surface T2, the film-shaped electronic device containing sheet assembly 10 containing the transponder 20 may be fixed to the sidewall 2 or bead 3.

The transponder 20 is mounted on the tire surface as follows. The film-shaped electronic device containing sheet assembly 10 containing the transponder 20 is bonded to the surface of a cured tire with an adhesive or the like, or is adhered to the surface of an uncured tire before set in a tire press.

In the case in which the film-shaped electronic device containing sheet assembly 10 is adhered to the outer surface of an uncured tire, the uncured tire is preferably set in the mold of a tire press as follows to be cured.

Figure 5:
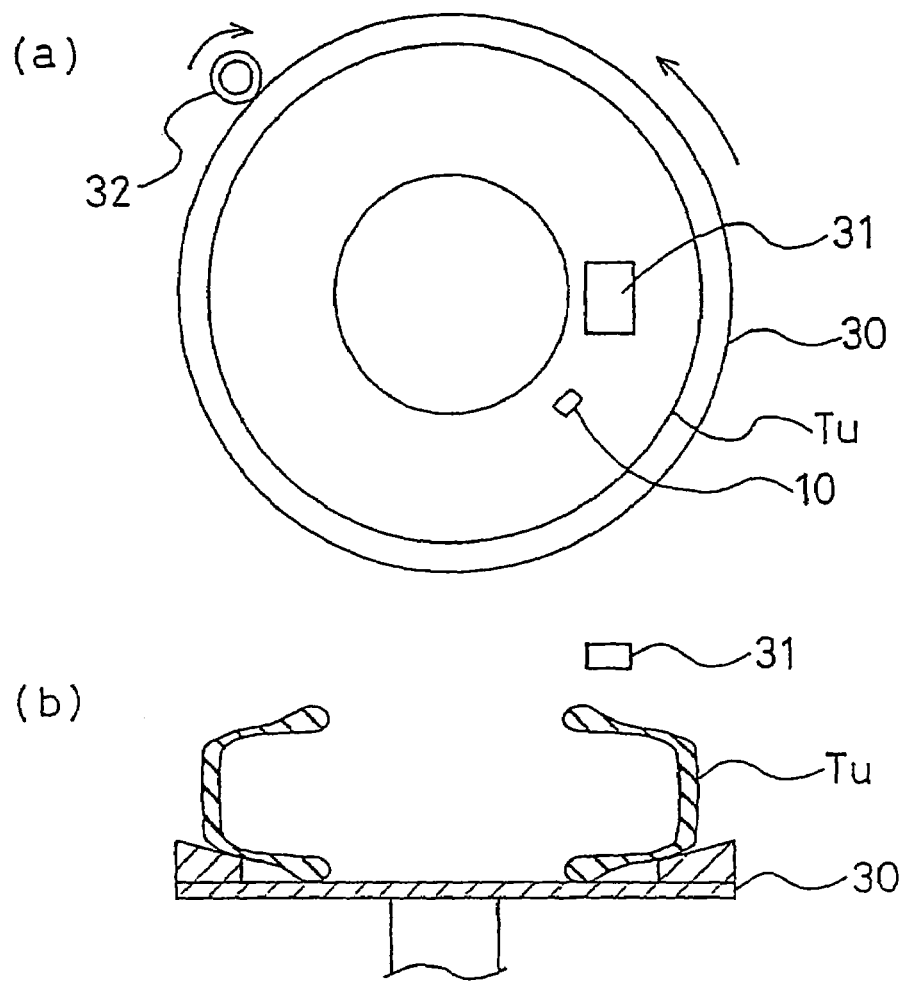
FIGS. 5a and 5b are a plan view and a cross-sectional view for illustrating a step before an uncured tire to the side wall outer surface of which the film-shaped electronic device containing sheet assembly adheres is set to a mold of a curing press.

In general, the outer surface of the sidewall 2 has concavo-convex patterns showing a manufacturer's name and the like, and the film-shaped electronic device containing sheet assembly is preferably fixed to a location where no concavo-convex part exists. As shown in FIG. 5, before an uncured tire Tu is set in the mold of a tire press, the uncured tire Tu is placed on a rotation table 30 in the same state as lying on its side when set in the mold, with the film-shaped electronic device containing sheet assembly 10 being positioned on the upper side thereof. A reading antenna 31 for the transponder 20 is placed thereabove, and when a rotation mechanism 32 rotates the rotation table 30, the reading antenna 31 receives a reply signal sent from the transponder 20 in the film-shaped electronic device containing sheet assembly 10 adhered to the uncured tire Tu rotating with the rotation of the rotation table. A computer (not shown) connected to the reading antenna 31 indexes the position of the film-shaped electronic device containing sheet assembly 10 based on the reply signal, and stops the rotation after adjusting the position of the film-shaped electronic device containing sheet assembly 10 on the basis of data previously input in the computer so as to be in a location where the concavo-convex patterns are not formed. The uncured tire in the adjusted state is carried and set in the mold by a loader (not shown), and is cured.

Figure 6:
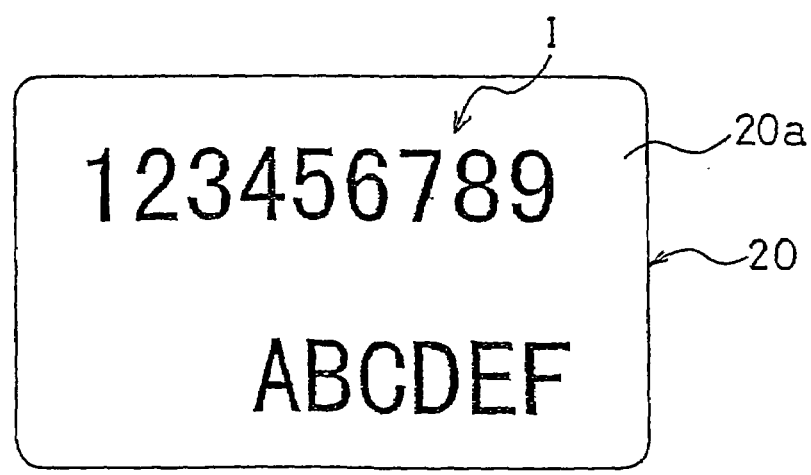
FIG. 6 is a plan view showing an example of a transponder on the surface of which information for identifying a tire is indicated.

In the case where the film-shaped electronic device containing sheet assembly 10 is fixed to the tire outer surface T1, as shown in FIG. 6, information I identical to the tire identification information stored in the integrated circuit 23 may be indicated on the outer surface 20a of the transponder 20. This allows for obtainment of the tire identification information without a reading device for the transponder 20.

In the drawing shown, the information I is shown with numerical and alphabetical characters into which the contents of the information I are coded, but may be shown with other characters. The color thereof may be any color if they can visually be made out. In the case where the information I for identifying a tire is shown on the outer surface 20a of the transponder 20, at least one of the sheet-shaped members 11 and 12 which is positioned on the front surface side thereof is formed of a transparent material in addition to a condition described later.

The sheet-shaped members 11 and 12 constituting the film-shaped electronic device containing sheet assembly 10 may be formed of any material if the transponder 20 is slidable and no bad affection is given to tire performances when fixed thereto, and are preferably formed of, for example, a resin having a melting point of 150° C. or more, and a low coefficient of friction in the form of the sheet-shaped member. The resins may preferably include, for example, fluorocarbon resins. The sheet-shaped members 11 and 12 may be formed from a sheet-shaped woven fabric or knit fabric.

The transponder 20 may be slidable between the sheet-shaped members 11 and 12 by coating a material which facilitates sliding of the transponder 20 on the inner surfaces of the sheet-shaped members in contact with the transponder 20 when the sheet-shaped members 11 and 12 are formed of a material which prevents the transponder 20 from sliding.

In the above embodiments, the pneumatic tire having a film-shaped transponder 20 has been described, but the present invention is also applicable to pneumatic tires having other film-shaped electronic devices instead of the transponder 20.

As illustrated above, according to the present invention, the film-shaped electronic device which is slidable between the sheet-shaped members disposed on the both sides of the film-shaped electronic device, is mounted on the tire surface or inside the tire, and therefore, the film-shaped electronic device slides freely between the sheet-shaped members when pulled or compressed by deformation of the tire, thus avoiding influences of the pulling and compressing. Accordingly, even if an inexpensive film-shaped electronic device is mounted thereon or therein, it can be prevented form breaking.

INDUSTRIAL APPLICABILITY

The present invention having the aforementioned excellent effects is very effectively applicable to a tire having a film-shaped electronic device.

What is claimed is:

1. A pneumatic tire having a film-shaped electronic device on a surface of the tire or inside the tire, the film-shaped electronic device being slidable between sheet-shaped members disposed on both surfaces of the film-shaped electronic device,
    wherein two sheet-shaped members disposed on the both surfaces have peripheries bonded to each other to thereby form a room between the two sheet-shaped members, in which the film-shaped electronic device is slidable, and
    wherein the sheet-shaped members comprise a fluorine resin or respectively have an inner surface coated with such a material which permits the film-shaped electronic device to slide thereon.

2. A pneumatic tire according to claim 1, wherein the film-shaped electronic device is a film-shaped transponder from which tire identification information can be read, the film-shaped transponder comprising a base film, an integrated circuit and a coil-shaped antenna, the integrated circuit and coil-shaped antenna being provided on the base film.

3. A pneumatic tire according to claim 2, wherein the film-shaped transponder is 0.2 to 0.8 mm in thickness.

4. A pneumatic tire according to claim 1, wherein the sheet-shaped members are formed of a resin which has a meting point of 150° C. or more.

5. A pneumatic tire according to claim 2, wherein the sheet-shaped members are formed of a resin which has a meting point of 150° C. or more.

6. A pneumatic tire according to claim 3, wherein the sheet-shaped members are formed of a resin which has a meting point of 150° C. or more.

7. A pneumatic tire having a film-shaped electronic device on a surface of the tire or inside the tire, the film-shaped electronic device being slidable between sheet-shaped members disposed on both surfaces of the film-shaped electronic device,
    wherein the film-shaped electronic device is a film-shaped transponder from which tire identification information can be read, the film-shaped transponder comprising a base film, an integrated circuit and a coil-shaped antenna, the integrated circuit and coil-shaped antenna being provided on the base film, and
    wherein the film-shaped transponder is placed on an outer surface of the tire, at least one of the two sheet-shaped members positioned on the front surface side thereof being formed of a transparent material, information identical to the tire identification information being shown on the front surface of the film-shaped transponder.

8. A pneumatic tire according to claim 7 wherein the film-shaped transponder is 0.2 to 0.8 mm in thickness.

9. A pneumatic tire according to claim 7 wherein the sheet-shaped members are formed of a resin which has a meting point of 150° C. or more.

10. A method of mounting a film-shaped electronic device, comprising:
    placing a film-shaped electronic device between sheet-shaped members, the sheet-shaped members being formed of fluorocarbon resin, or having inner surfaces coated with a material that enables the film-shaped electronic device to slide between the sheet-shaped members,
    adhering peripheral edges of the sheet-shaped members to each other to thereby form a film-shaped electronic device containing sheet assembly having a room between the sheet-shaped members, the film-shaped electronic device being slidably contained in the room, and fixing the film-shaped electronic device containing sheet assembly inside or to a surface of an uncured tire, or to a surface of a cured tire.

* * * * *